(12) United States Patent
Wurst et al.

(10) Patent No.: US 6,435,230 B2
(45) Date of Patent: Aug. 20, 2002

(54) METERING DEVICE

(75) Inventors: Reiner Wurst, Auenwald; Manfred Kuhnle, Schwaikheim; Werner Runft, Winnenden, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/867,439

(22) Filed: May 31, 2001

(30) Foreign Application Priority Data

May 31, 2000 (DE) .......................... 100 27 008

(51) Int. Cl.$^7$ .............. B65B 1/04; B65B 3/04; B65B 37/00; B67C 3/00
(52) U.S. Cl. ................. 141/239; 141/144; 141/147; 141/181; 141/240; 53/473
(58) Field of Search .................. 141/114, 144, 141/147, 166, 181, 239, 240; 222/367; 53/384.1, 473

(56) References Cited

U.S. PATENT DOCUMENTS 2,730,285 A * 1/1956 Lazzery ........................ 141/144
4,848,421 A * 7/1989 Froese et al. ................. 141/114
5,320,146 A * 6/1994 Stevie .............................. 141/1

FOREIGN PATENT DOCUMENTS

FR 2689092 A1 10/1993

* cited by examiner

Primary Examiner—Timothy L. Maust
(74) Attorney, Agent, or Firm—Ronald E. Greigg

(57) ABSTRACT

A metering device has a filling material container with a metering disk. Metering bores for products such as microtablets are disposed in the metering disk. Underneath the metering disk in a transfer region, there is a capsule filling shaft which is disposed in line with prepared capsule bottoms. The invention proposes supporting the filling material container so that it can rotate on an axis which is disposed inclined in relation to the vertical. This permits the microcapsules to be easily dispensed into the metering bores, permits the microtablets to be handled in a manner that is gentle on the product, and permits a high performance of the metering device.

16 Claims, 3 Drawing Sheets

FIG. 2
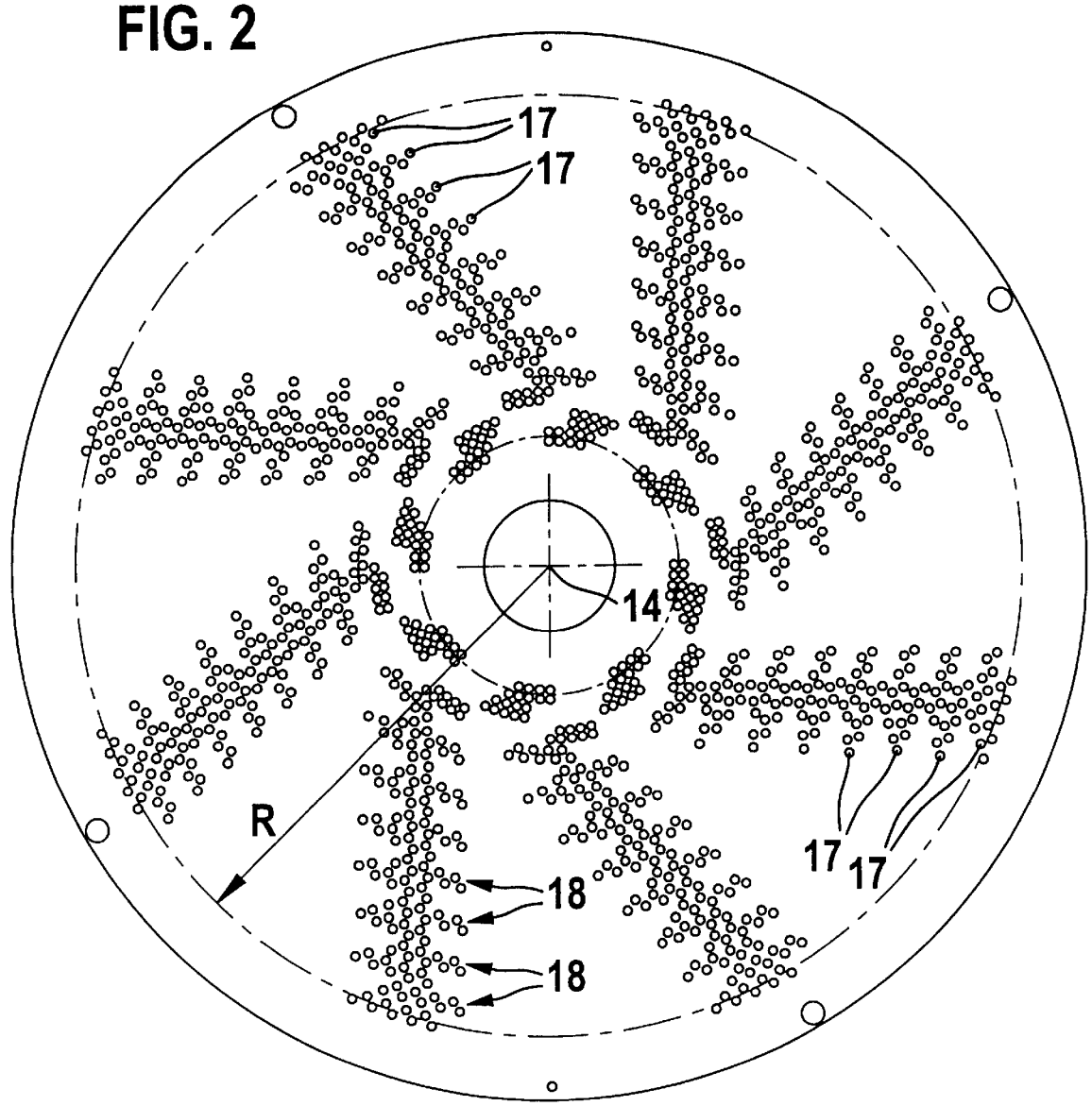
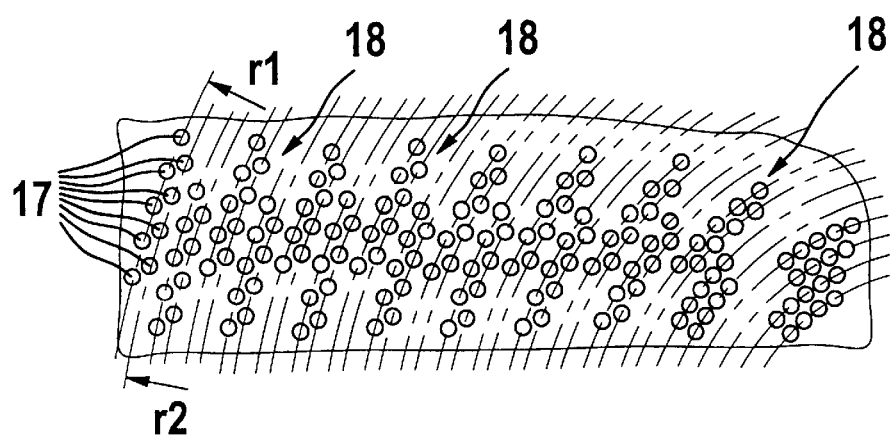
FIG. 3

METERING DEVICE

BACKGROUND OF THE INVENTION

1. Field of the Invention

The invention relates to a metering device for metering and dispensing powder into hard gelatin capsules.

2. Description of the Prior Art

A metering and dispensing device of the type with which this invention is covered is disclosed by DE 196 51 237 A1. The known device is designed for metering and dispensing powder into hard gelatin capsules and to that end, has a powder deflecting body as well as a tamping and ejecting die so that powder can be compressed in metering bores of a metering disk and can be transferred into prepared bottoms of hard gelatin capsules. The known device should be improved in such a way that it is suitable for metering granular products or products in small pieces, in particular pharmaceutical products such as microtablets, capsules, dragees, or the like, wherein the highest possible performance and the gentlest treatment of the product should be achieved.

OBJECT AND SUMMARY OF THE INVENTION

The metering device according to the invention has the advantage over the prior art that it is mechanically simple in design and permits a high performance with metering that is gentle to the product.

BRIEF DESCRIPTION OF THE DRAWINGS

The invention will be better understood and further objects and advantages thereof will become more apparent from the ensuing detailed description taken in conjunction with the drawings, in which FIG. 2 is a top view of a metering disk, FIG. 3 shows a detail from FIG. 2.

DESCRIPTION OF THE PREFERRED EMBODIMENTS

Figure 1:
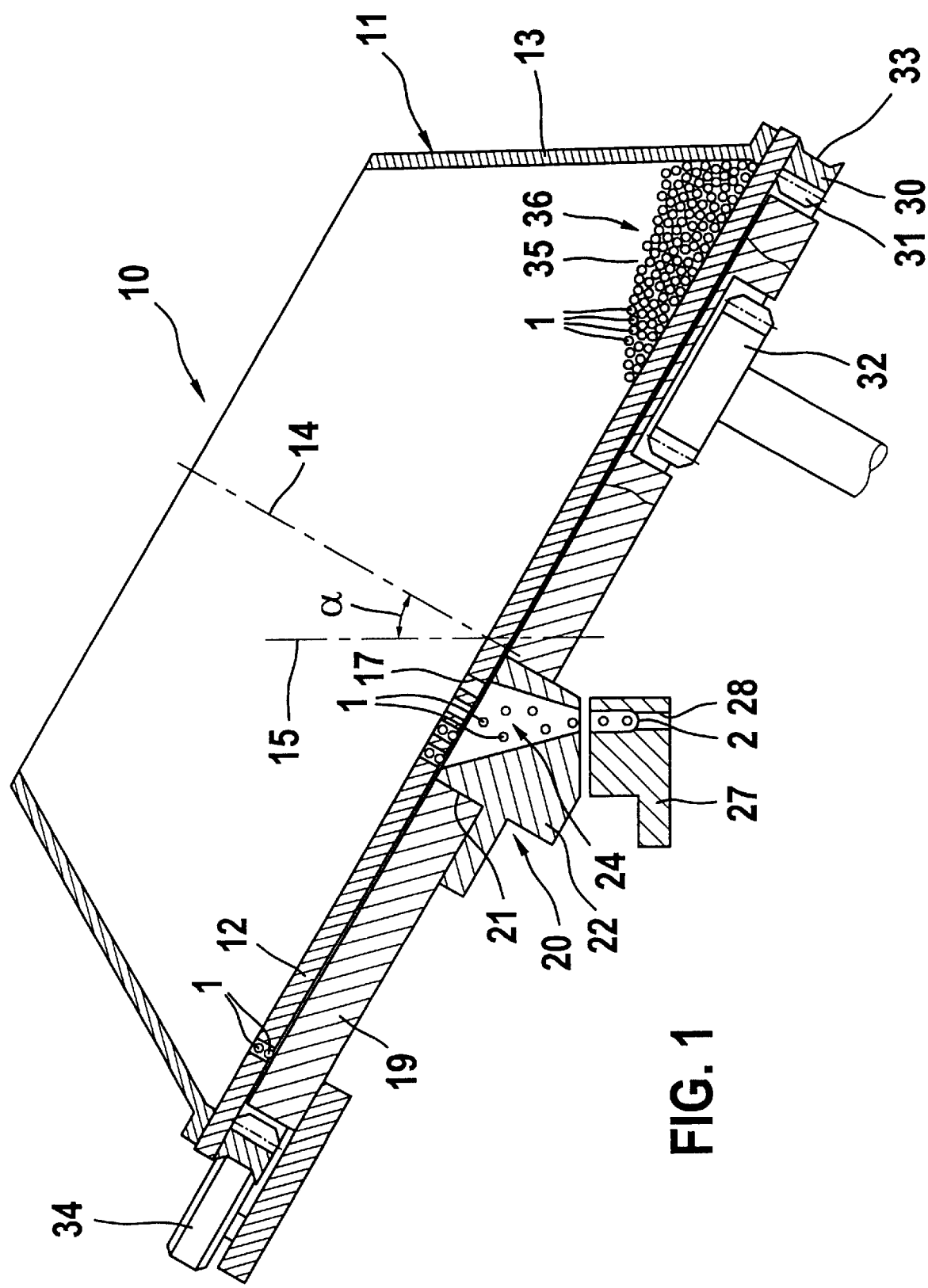
FIG. 1 is a simplified longitudinal section through the metering device according to the invention.

The device 10 shown in FIG. 1 is used to meter and dispense so-called microtablets 1 into capsule bottoms 2 of hard gelatin capsules. However, the device 10 can also be used to meter other products, such as capsules, dragees, bonbons, or the like. Instead of capsule bottoms 2, other suitable receptacles for the products can be used, e.g. cups of a blister packing strip.

The device 10 has a filling material container 11, which is comprised of a metering disk 12 and a filling material container ring 13 connected to the metering disk 12. The filling material container 11 is supported so that it can rotate around an axis 14 which is pivoted in relation to the vertical axis 15 by an angle α which in the exemplary embodiment is approx. 30 degrees.

As can best be inferred from FIGS. 2 and 3, a large number of cross sectionally round metering bores 17 are embodied in the metering disk 12. In the exemplary embodiment, the metering bores 17 are arranged in such a way that at a particular radius R from the axis 14, there is a group of five or four metering bores 17 every 45 degrees of rotation angle. Furthermore, according to FIG. 3, a group of five metering bores 17 with a radius $r_1$ from the axis 14 and four neighboring metering bores 17 with a radius $r_2$ from the axis 14 are combined into a respective bore group 18, which is associated with one capsule bottom 2. If, according to FIGS. 2 and 3, the groups of four and five metering bores 17 are disposed offset from each other at larger radii, then a particularly dense grouping of metering bores 17 for a bore group 18 can be achieved in a smaller radius range.

According to FIG. 1, two microtablets 1 are disposed one over the other in each metering bore 17, wherein the diameter of the metering bores 17 is respectively slightly greater than the diameter of the microtablets 1. In connection with FIGS. 2 and 3, it is clear that in accordance with the nine metering bores 17 associated with a bore group 18, a total of eighteen microtablets 1 are dispensed into a capsule bottom 2.

A plate- or ring-shaped countersupport 19 is disposed against the underside of the metering disk 12 and closes the bottoms of the metering bores 17, with the exception of a transfer region 20, as the filling material container 11 is rotated around the axis 14. In the transfer region 20, the countersupport 19 has a recess 21 for a capsule filling shaft 22.

Figure 5:
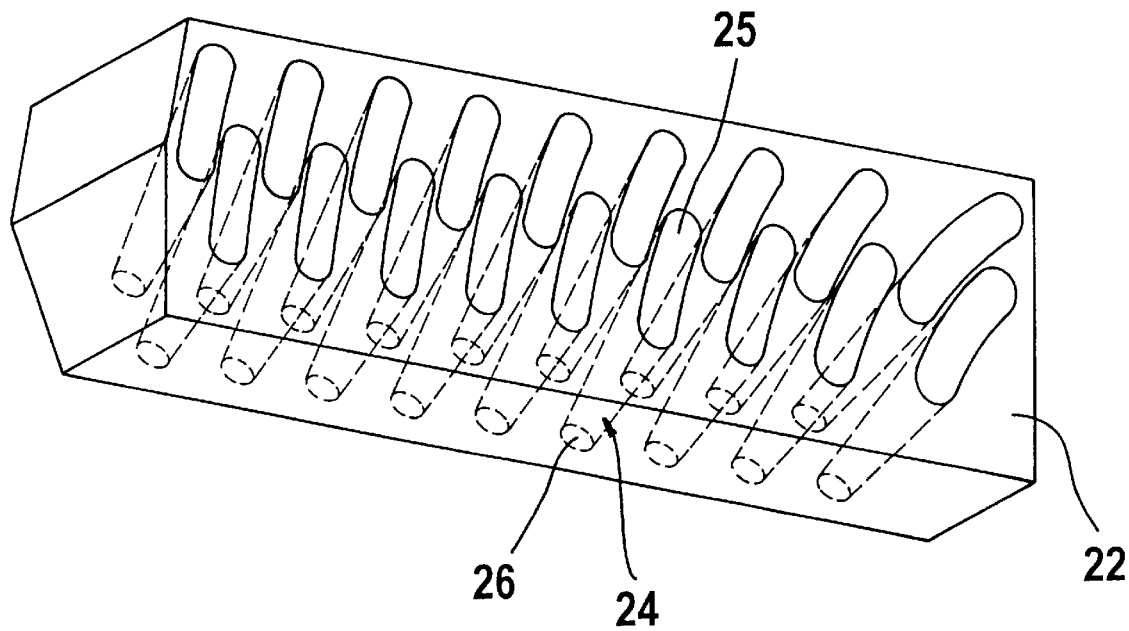
FIG. 5 shows a perspective view of a tablet filling shaft.

The block-shaped tablet filling shaft 22 has a funnel-like shaft 24 for each bore group 18. o n the side oriented toward the metering disk 12, this shaft 24 has an oblong entry cross section 25 (see FIG. 5) which is adapted in accordance with the respective outer limit of a bore group 18 and on the side oriented toward the capsule bottoms 2, has an exit cross section 26 which is adapted to the diameter of the capsule bottom 2.

A capsule part carrier 27 with bores 28 for the capsule bottoms 2 is disposed underneath the tablet filling shaft 22. In order to receive the microtablets 1, the capsule part carrier 27 can be pivoted according to FIG. 1 into a position in which the capsule bottoms 2 are flush with exit cross sections 26 of the shafts 24. In order to close the capsule bottoms 2, the capsule part carrier 27 can be pivoted away laterally. For the design and function of a capsule part carrier 27 of this kind in connection with a capsule filling and closing machine, reference is made to DE 38 30 013 A1, which is incorporated herein by reference to the extent that the device 10 can be a component of a capsule filling and closing machine of this kind.

A guide and drive ring 30 is fastened to the underside of the metering disk 12 in its edge region. On its inner circumference, the guide and drive ring 30 has an internal gearing 31, which is disposed in operational connection with a drive pinion 32 of the rotating drive of the filling material container 11, which is preferably embodied as a servomotor. A continuous guide groove 33 is embodied on the outer circumference of the guide and drive ring 30 and is engaged by three guide rollers 34 which are disposed offset from one another by 120 degrees and provide for the support of the filling material container 11, wherein only one guide roller 34 can be seen in FIG. 1 because of the view selected.

It is also essential that according to FIG. 1, the filling material, which is disposed in the filling material container 11 and is in the form of microtablets 1, does not completely fill the filling material container 11, but only reaches a filling material level 35. This filling material level 35 is below the level of the entry cross sections 25 of the capsule filling shaft 22 and the transfer region 20. Furthermore, the angle α of the axis 14 of the filling material container 11 must be big enough that upon rotation of the metering disk 12, microtablets 1 disposed above the metering bores 17 roll back into the storage region 36 of the filling material due to the downward pulling force of the slope.

The device 10 operates as follows: The filling material container 11 is rotated either cyclically or continuously by the drive pinion 32. In the course of rotation, the metering bores 17 travel down into the storage region 36 with microtablets 1, as a result of which two microtablets 1 are disposed one over the other in each metering bore 17. With further rotation of the metering disk 12, the metering bores 17 filled with the microtablets 1 travel out of the storage region 36. If additional microtablets 1 have collected in the region of the metering bores 17, then with further rotation of the metering disk 12, these additional microtablets 1 roll or slide back into the storage region 36 of the filling material container 11 due to the downward pulling force of the slope acting on them. As soon as the metering bores 17 come into line with the shafts 24 of the tablet filling shaft 22, the microtablets 1 fall out of the metering bores 17 into the tablet filling shaft 22 and from there into the readied capsule bottoms 2. The filled capsule bottoms 2 are then pivoted away by means of the capsule part carrier 27, out of the filling position shown in FIG. 1, whereupon other, empty capsule bottoms 2 are brought under the capsule filling shaft 22. Then the events described above are repeated.

Figure 4:
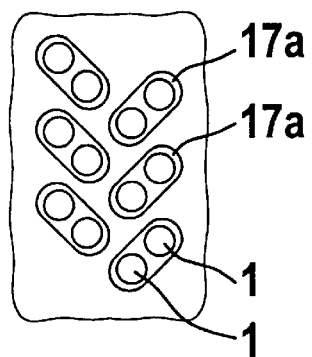
FIG. 4 shows an arrangement of metering bores that has been modified in relation to FIG. 3.

It should also be mentioned that the form of the metering bores is not limited to round metering bores 17. Rather, the metering bores 17a can also be embodied e.g. as oblong in accordance with FIG. 4 so that each pair of microtablets 1 can be disposed next to one another in a plane. In this instance, the thickness of the metering disk is such that it is only possible to arrange the microtablets 1 in a plane of the metering disk or in the metering bores 17a is possible. Furthermore, the arrangement of the metering bores 17a shown in FIG. 4 is such that they are respectively offset from one another by 90 degrees so that a space-saving arrangement is achieved.

The foregoing relates to preferred exemplary embodiments of the invention, it being understood that other variants and embodiments thereof are possible within the spirit and scope of the invention, the latter being defined by the appended claims.

We claim:

1. A metering device (10) for pharmaceutical products, with a filling material container (11) supported on a rotational axis (14), with metering bores (17) for the products embodied at the bottom of the filling material container (11), and with a covering element (19) which closes the metering bores (17) on the underside of the metering container (11) with the exception of in a transfer region (20), wherein in the transfer region (20), the products are dispensed into prepared receptacles (2), the improvement wherein the rotation axis (14) of the filling material container (11) is disposed inclined in relation to vertical (15) so that upon rotation of the filling material container (11) around the rotation axis (14), the products collect—with the exception of the metering bores (17)—in a storage region (36) and that the transfer region (20) is disposed at a product-free level above the storage region (36), wherein a drive ring (30) is fastened to the underside of the filling material container (11) and has an internal gearing (31) which cooperates with an externally geared drive pinion (32).

2. The metering device according to claim 1, wherein a continuous guide groove (33) is embodied on the circumference of the drive ring (30) and cooperates with roller-shaped guide elements (34).

3. A metering device (10) for pharmaceutical products, with a filling material container (11) supported on a rotational axis (14), with metering bores (17) for the products embodied at the bottom of the filling material container (11), and with a covering element (19) which closes the metering bores (17) on the underside of the metering container (11) with the exception of in a transfer region (20), wherein in the transfer region (20), the products are dispensed into prepared receptacles (2), the improvement wherein the rotation axis (14) of the filling material container (11) is disposed inclined in relation to vertical (15) so that upon rotation of the filling material container (11) around the rotation axis (14), the products collect—with the exception of the metering bores (17)—in a storage region (36) and that the transfer region (20) is disposed at a product-free level above the storage region (36), wherein in the transfer region (20), there is a transfer element (22) that has through bores (24) which, in a transfer position for the products, come into line with the metering bores (17) and that underneath the transfer element (22), the receptacles (2) are disposed in line with the through bores (24) and wherein respective numbers of metering bores (17) are associated with a receptacle (2), that on the side oriented toward the filling material container (11), one respective through bore (24) covers a respective number of metering bores (17), and that on the side oriented toward the receptacle (2), the through bores (24) have outlet cross sections (26) adapted to the receptacles (2).

4. The metering device according to claim 3, wherein the respective numbers of metering bores (17) are embodied as round and are disposed on at least one arc segment of the filling material container (11).

5. The metering device according to claim 4, wherein the respective numbers of metering bores (17) are disposed on several arc segments with different radii ($r_1$, $r_2$) from the rotation axis (14) of the filling material container (11) and are disposed offset from one another.

6. The metering device according to claim 4, wherein each metering bore (17) has a height which corresponds to a multiple of the height of a product.

7. The metering device according to claim 3, wherein each metering bore (17a) has a cross sectional area which is suitable for containing several products disposed next to one another.

8. The metering device according to claim 3, wherein the filling material container (11) is comprised of a format-dependent metering disk (12), which contains the metering bores (17; 17a), and a rotating filling material container wall (13), which is connected to the top of the metering disk (12).

9. The metering device according to claim 5, wherein each metering bore (17) has a height which corresponds to a multiple of the height of a product.

10. The metering device according to claim 3, wherein the receptacles are capsule bottoms (2) of hard gelatin capsules which are disposed in a capsule part carrier (27).

11. The metering device according to claim 4, wherein the receptacles are capsule bottoms (2) of hard gelatin capsules which are disposed in a capsule part carrier (27).

12. The metering device according to claim 5, wherein the receptacles are capsule bottoms (2) of hard gelatin capsules which are disposed in a capsule part carrier (27).

13. The metering device according to claim 3, wherein the receptacles are cups of a blister packing strip.

14. The metering device according to claim 5, wherein the receptacles are cups of a blister packing strip.

15. The metering device according to claim 4, wherein the filling material container (11) is comprised of a format-dependent metering disk (12), which contains the metering bores (17; 17a), and a rotating filling material container wall (13), which is connected to the top of the metering disk (12).

16. The metering device according to claim 4, wherein a drive ring (30) is fastened to the underside of the filling material container (11) and has an internal gearing (31) which cooperates with an externally geared drive pinion (32).

* * * * *